Feb. 1, 1955     C. F. FRAGOLA ET AL     2,700,898
COMPOUND INDICATING INSTRUMENT
Filed Jan. 12, 1950
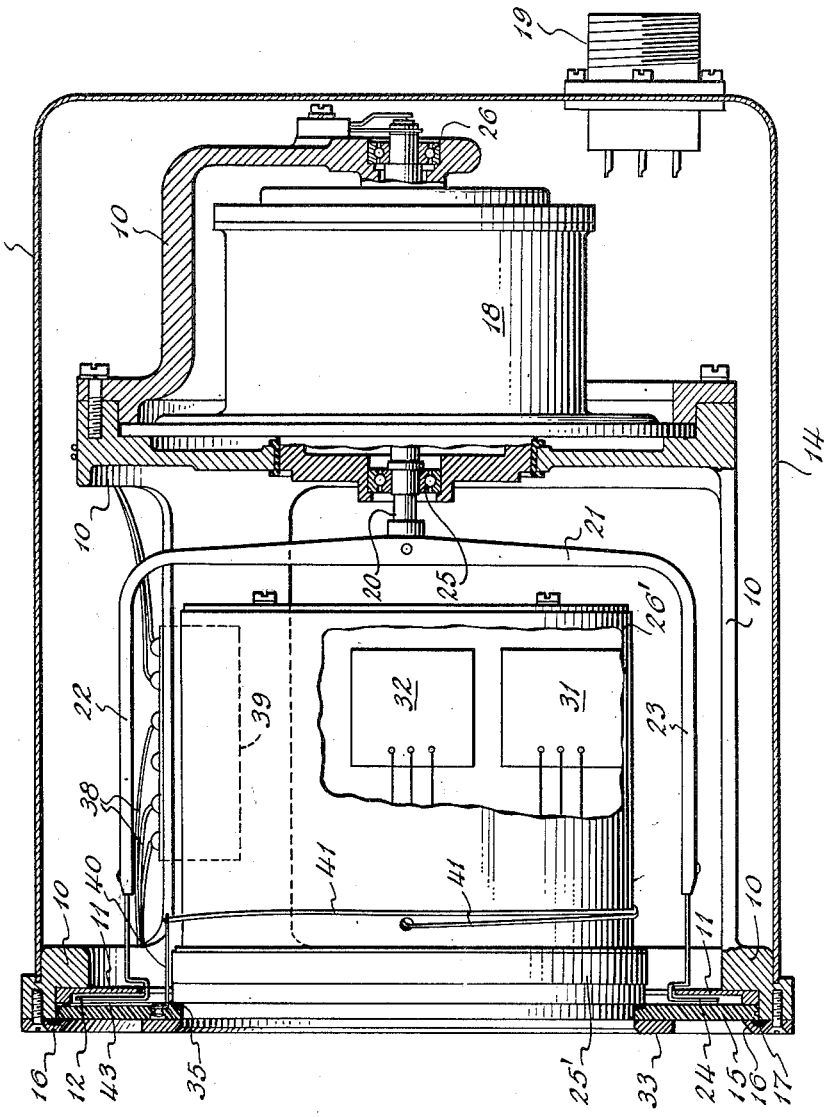
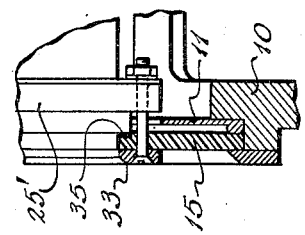
INVENTORS
CAESAR F. FRAGOLA
OTTO KOLB
BY Arthur H. Serrell
THEIR ATTORNEY

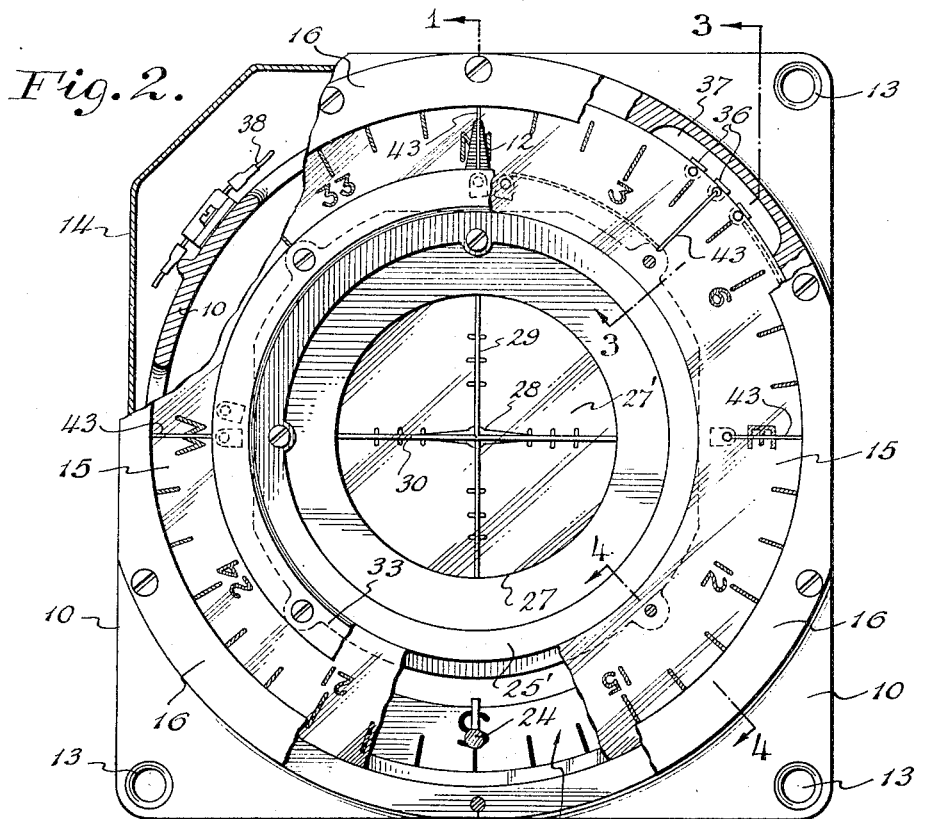

United States Patent Office 2,700,898
Patented Feb. 1, 1955

2,700,898

COMPOUND INDICATING INSTRUMENT

Caesar F. Fragola, East Hempstead, and Otto Kolb, North Pelham, N. Y., assignors to The Sperry Corporation, a corporation of Delaware Application January 12, 1950, Serial No. 138,102

4 Claims. (Cl. 73—178)

This invention relates to a compound indicating instrument having a dual face. The instrument shown in the drawing as a practical embodiment of the present inventive concepts may be of a character such as employed on aircraft to depict visually to the pilot of the craft desired flight information. The information provided by the dual indicators, in the present instance, enables the pilot to guide the craft properly as well as provide a continuous indication of the heading of the craft. The guide indicator illustratively depicted in the drawing may be of the type that corresponds to the indicating instrument 10 shown and described in detail in the copending application of Spencer Kellogg, 2nd, S. N. 15,064, filed March 16, 1948, for Flight Indicating Systems for Dirigible Craft, now U. S. Letters Patent No. 2,613,350, issued October 7, 1952. The heading indicator shown in the drawing may take the form of a repeater compass receiver that is operated by information obtained from a reference source such as provided by a gyro-magnetic compass system as shown in Patents Nos. 2,393,974 to Curry and 2,383,461 to Esval, Fragola and Beach.

Heretofore, the noted indicators have been incorporated in separate instruments located at different positions on the instrument board panel of the aircraft. This necessitated that the pilot shift his attention from the guide indicator to the heading indicator each time he desired to ascertain the particular heading of the craft. The compound indicator constructed in accordance with the present invention enables the pilot to center his attention on a single instrument while he observes both types of information.

One of the features of the invention resides in the provision of a compound indicating instrument in which a window or transparent seal at the front of the instrument provides a structural element by which the parts are connected and spaced.

Another feature of the invention resides in the construction of the window element of the instrument to include slotted portions containing electrical leads as well as electrical terminals connecting the leads.

Other features and details of the invention will be apparent from the following description when read in relation to the accompanying drawings wherein:

Fig. 1 is a section view taken on line 1—1, Fig. 2,

Fig. 2 is a front elevation, with parts cut away, showing an indicating instrument embodying the present inventive concepts, Fig. 3 is a section view taken on line 3—3, Fig. 2, Fig. 4 is a section view taken on line 4—4, Fig. 2, Fig. 5 is a perspective view of the window, per se, of the improved instrument through which the compass card and pointer, as herein shown, are viewed, Fig. 6 is a section view taken on line 6—6, Fig. 5, and Fig. 7 is a section view taken on line 7—7, Fig. 5.

With reference to the drawing, the heading and guide indicator shown provides a compound instrument having an outer frame 10 with an annular dial or compass card 11 mounted thereon. The heading of a craft employing the instrument is observed in this type of indicator by comparing the position of a pointer 12 in relation to the card 11. As shown in Fig. 2, the corners of the front portion of the frame 10 may be provided with suitable openings 13 therein by means of which with suitable screw fastenings (not shown) the indicator is fixedly mounted on the instrument panel of the craft with the face of the instrument in a substantially vertical position. An outside cover 14 shown in Fig. 1 encloses the parts of the instrument behind the panel on which it is mounted. The window 15 or transparent seal for the front of the indicating instrument provided in the embodiment of the invention herein shown may be annular in form as shown in Fig. 5. As particularly shown in Fig. 3, the window 15 is secured to the frame 10 in front of the dial or compass card 11, by an exterior ring 16. This is accomplished by the screw fittings shown in this figure connecting the ring 16 and frame 10. Flexible gasket 17 may be suitably interposed between the ring 16 and the window 15.

The stator 18 of an electrical receiver is shown in Fig. 1 connected to the right hand end of frame 10. This receiver constitutes a means for operating the heading pointer 12, the same being connected through suitable leads (not shown) and plug 19 on cover 14 to the transmitter 148 shown and described in U. S. Letters Patent No. 2,383,461 or transmitter 80 in Patent No. 2,393,974. The rotor (not shown) of the receiver positions a shaft 20 having a bail piece 21 fixed therein with parallel arms 22, 23. The pointer 12 is connected to and extends from the end of the arm 22 of the bail piece. A second pointer 24 shaped in the form of a circle provides an indication on card 11 that is 180° removed from the correct heading which facilitates procedure turns. Pointer 24 is connected to the end of arm 23 of the bail piece 21. Both pointers 12 and 24 have a U-bend therein so that the same clear the adjacent surface of the annular compass card 11. The tips of the pointers extend to a readable position in front of the compass card 11.

The bail piece 21, pointers 12, 24 and shaft 20 are supported by the frame 10 with 360° of freedom by the spaced bearings 25, 26. Conventional lines of indicia which extend in a radial direction define the main and intermediate scale markings of the compass on the usable face of the annular card or dial element 11 of the indicator. The heading illustrated in Fig. 2 for the craft using the instrument is north. As the craft changes its heading, the described receiver operates to move the bail piece 21 and the pointers 12 and 24 correspondingly. The pilot of the craft observes the pointer and steers his craft to bring it to the desired heading.

The guide indicator for the combined instrument herein shown is a cross pointer meter of the character described in the hereinbefore noted Letters Patent No. 2,613,350 in the name of Spencer Kellogg. The frame for this indicator is indicated at 25' in Figs. 1 and 3. The frame 25' includes a cover 26' and in this instance, a circular window 27, on the front face of the instrument. In the construction illustrated, window 27 provides a circular dial with the representation of an aircraft 28 in a central position thereon. The dial also includes vertical and horizontal parallel scale markings. The element cooperating with the dial to provide the indication of the instrument is provided by a pair of pointers 29 and 30. The vertical pointer 29 is movable to the right or left of the aircraft 28 on the dial by an operating means designated at 31 in Fig. 1. The horizontal pointer 30 is movable above or below the aircraft 28 on the dial by an operating means designated at 32 in Fig. 1. The pointers operate in front of a fixed background element 27' of a contrasting color thereto. The background element is suitably connected to the frame 25' (not shown). As an alternative construction, the background element 27' appearing at the circular opening on the front of frame 25' may constitute the dial of the guide indicator. With this arrangement the aircraft 28 appearing on the window 27 would be centrally located on the element 27', the window 27 would be clear and the pointer 29, 30 would move in front of the representation of the aircraft 28. The parts indicated generally at 31 and 32 are electrical meters whose rotor parts directly actuate the pointers 29 and 30. In Fig. 2, the pointers 29 and 30 are shown in a central or zero position with relation to the dial index as represented by the aircraft 28.

In the arrangement provided, the dial for the second frame provided by the guide indicator is smaller than the opening in the annular window 15. Frame 25′ is also smaller than the frame for the heading indicator. As the larger frame 10 is situated outside of the smaller frame 25′, the respective frames are defined by the terms "outer" and "inner" in the claims.

As shown in Figs. 1 and 4, the inner frame 25′ is connected to frame 10 by the window 15 only. The window is also the only element that supports the inner frame 25′ within the frame 10. This connection is made by a number of nut and bolt contacts, in this instance, the bolt elements threading continuous openings in an outside ring 33 in the front of the instrument, openings 34 in the window 15, Fig. 5, and openings in the rim of the frame 25′. A flexible washer 35 may be employed in this connection between the inside surface of the window 15 and the outside front surface of the frame 25′ for the guide indicator. The window supports the frame 25 in spaced relation to the frame 10 to provide an unobstructed area between the frames for the pointer 12 readable on the annular compass card 11. As bail piece 21 with the attached pointer 12 must be unobstructed, through 360° of travel, it is not possible to connect the two frames to the rear of the compass card 11 as otherwise such a connection would interfere with the freedom of movement of the heading pointer. The mounting provided by the window 15 is also such that the dials for the respective indicators are arranged in concentric relation, the smaller circular dial or window of the guide indicator being coaxial with the compass card 11 of the heading indicator. In the construction shown, dial or window 27 is smaller than the opening in the annular compass card 11.

In order to operate the pointers of the guide indicator, it is necessary to apply controlling signal voltages to the operating means indicated at 31, 32 in Fig. 1. In accordance with the present invention, the window 15 is constructed to include electrical terminals and leads so that there is no wiring between the frames 10 and 25′ that interfere with the operation of the heading pointer 12. As shown in Fig. 5, six terminals 36 are connected to the window 15 at the outside edge thereof adjacent the frame 10. The terminals 36 project inwardly from the face of the instrument through suitable openings 37, Fig. 3, in the frame 10. Leads such as indicated at 38 in Fig. 3 connect the terminals 36 on the window with a junction strip 39 fixedly mounted on the frame 10 as shown in Fig. 1. The controlling energy for the operating means 31, 32 is fed to the fixed strip 39 from an outside source by way of plug 19 and suitable electrical leads (not shown). The window 15 also includes six terminals indicated at 40 at the edge of the window next to the annular opening therein. As shown in Fig. 1, the terminals 40 are situated adjacent the inner frame 25′ for the instrument. Leads 41 connect the respective terminals 40 to the operating means 31 and 32. The inside face and rim of the window 15 is slotted as indicated at 42 in Figs. 5, 6 and 7. The arcuate slots 42 connect with radial slots 43, Fig. 1, in the window that are arranged parallel to the indicia on the compass card 11. The five radial slots 43 shown in Fig. 2 respectively appear at the west, north-west, north, north-east and east positions represented on the compass card 11. The slot 43 not appearing in Fig. 2 is situated at the south position represented on the compass card. The respective terminals 36 and 40 are connected by electrical leads 44 contained in the slots 42, 43, the same preferably being cemented in position. The portion of the respective leads 44 in the radially extending slots 43 is not noticeable as the same lie in front of and parallel to the primary points of the compass card. The leads 44 being situated in front of the heading pointer 12 do not interfere with its operation.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. A heading and guide indicating instrument having an outer frame with an annular compass card having radial indicia thereon and a bail piece extending from said frame with 360° of freedom having a pointer readable on the compass card to provide a heading indication, means for operating said heading pointer; an inner frame having a circular dial smaller than the opening in the annular compass card, vertical and horizontal pointers readable on the dial to provide a guide indication, electrical means for operating the vertical and horizontal pointers; and a window for the instrument connecting the frames structurally with the compass card arranged in concentric relation to the guide dial, said window supporting said inner frame in spaced relation to the outer frame to provide an unobstructed area between the frames for the bail piece and the heading pointer.

2. An instrument as claimed in claim 1, in which said window includes electrical terminals adjacent the inner frame connected to the electrical means for operating the vertical and horizontal pointers, electrical terminals adjacent the outer frame, and slots therein containing electrical leads arranged parallel to the indicia on the compass card connecting the terminals adjacent the outer frame and the terminals adjacent the inner frame.

3. In a heading and guide indicating instrument, an outer frame with an annular compass card having radial scale markings thereon and a rotatable bail piece extending from the frame with 360° of freedom about an axis normal to the card having a pointer readable on the radial scale markings; an inner frame having a fixed dial smaller than the opening in the annular compass card having guide scale markings thereon and a pointer readable on the guide scale markings; and a window for the instrument connecting the frames structurally with the dial on the inner frame centrally located relative to the card in the outer frame, said window supporting said inner frame in spaced relation to the outer frame to provide an unobstructed area between the frames for the bail piece and the pointer readable on the compass card.

4. In a compound indicating instrument, an outer frame with an annular fixed dial having radial scale markings thereon and a rotatable bail piece extending from the frame with 360° of freedom about an axis normal to the dial having a pointer readable on the scale markings; an inner frame having a circular fixed dial smaller than the opening in the annular fixed dial of the outer frame having parallel scale markings thereon and a pointer readable on the parallel scale markings; and a window for the instrument connecting the frame structurally with the dial on the inner frame centrally located relative to the dial on the outer frame, said window supporting said inner frame in spaced relation to the outer frame to provide an unobstructed area between the frames for the bail piece and the pointer readable on the radial scale.

References Cited in the file of this patent

UNITED STATES PATENTS

| Number | Name | Date |
|---|---|---|
| 459,977 | Moller | Sept. 22, 1891 |
| 1,850,640 | Sperry et al. | Mar. 22, 1932 |
| 1,935,740 | Gette, Jr. | Nov. 21, 1933 |
| 2,080,490 | Kollsman | May 18, 1937 |
| 2,123,376 | Moeger | July 12, 1938 |
| 2,275,344 | Bernhard et al. | Mar. 3, 1942 |
| 2,424,570 | Jenks | July 29, 1947 |

FOREIGN PATENTS

| Number | Country | Date |
|---|---|---|
| 540,399 | Great Britain | Oct. 15, 1941 |